HUE EXPANDER CIRCUITS

Filed Oct. 2, 1969

INVENTOR
Paul J. Whiteneir, Jr.
By Pendleton, Neuman, Seibold & Williams
Attys

United States Patent Office 3,525,802
Patented Aug. 25, 1970

3,525,802
HUE EXPANDER CIRCUITS

Paul J. Whiteneir, Jr., Fort Wayne, Ind., assignor to The Magnavox Company, Fort Wayne, Ind., a corporation of Delaware Continuation-in-part of application Ser. No. 823,781, May 12, 1969. This application Oct. 2, 1969, Ser. No. 863,236
Int. Cl. H04n 9/12
U.S. Cl. 178—5.4 11 Claims

ABSTRACT OF THE DISCLOSURE

Color television hue expander circuits are disclosed having bipolar transistor chrominance signal and reference gates and phase shifting circuits allowing the use of a single reference signal gate.

CROSS REFERENCE TO RELATED APPLICATION

This application is a continuation-in-part of an application originally filed by Paul E. Knauer and Paul J. Whiteneir, Jr., on May 12, 1969 entitled Method and Apparatus for Modifying Electrical Signals, Ser. No. 823,781.

BACKGROUND OF THE INVENTION

This invention relates to electrical circuits for processing information, more particularly, to color television hue expander circuits and, still more particularly, to hue expander circuits using a single reference gate.

In the above-identified parent application there are disclosed a plurality of electric circuits useful in NTSC and similar color television transmission systems for expanding the phase range in a received chrominance signal which will produce on the picture tube face of a color television receiver a color having a hue characteristic of flesh. One type of circuit there described detects the presence of a color near flesh in the received chrominance signal and then modifies that signal by adding an appropriate correction signal. Phase selective aperture gates select those components of the received chrominance signal representing red or yellow hues and thus having a phase either lagging or leading flesh or I phase by approximately 30 degrees. The resultant components are then phase shifted about 90° and added to the received chrominance signal such that the chrominance signal hue is altered toward flesh.

In the development of circuits to perform the thus described functions, a number of desiderata were recognized. Satisfactory phase selective aperture gates had to be developed. They had to have a relatively narrow aperture so that colors near flesh would be most affected by the circuit and the correction signals would be of proper phase. It was also found desirable that both aperture gates be driven by a common reference or keying signal. In order that the correction signals be in time coincidence with the correct portion of the chrominance signal, it was found desirable to exclude low pass filters. The circuits, to be commercially satisfactory, were required to be characterized by the utmost in reliability of operation, simplicity in design, and economy in construction.

SUMMARY OF THE INVENTION

This invention provides circuitry for use in information processors and particularly in color television hue expander circuits for detecting those components in a received chrominance signal having a phase within a plurality of phase ranges centered about predetermined phases and combining the detected signals with the received chrominance signal. More specifically, this invention provides such circuitry wherein the chrominance signal and the detected signals are phase shifted in such a manner that a single reference signal may be used to detect those components within a plurality of phase ranges. Still more specifically, this invention provides phase selective and reference gates for use in such hue expander circuits.

DESCRIPTION OF THE PREFERRED EMBODIMENT

In the subsequent description, this invention will be described in relation to hue expander circuits for use in conventional, American compatible color television receivers using the NTSC color transmission system. It will be obvious to those skilled in the art that the disclosed circuitry can be adapted both to other types of color television transmission systems and to systems for transmitting other types of information.

Figure 1:
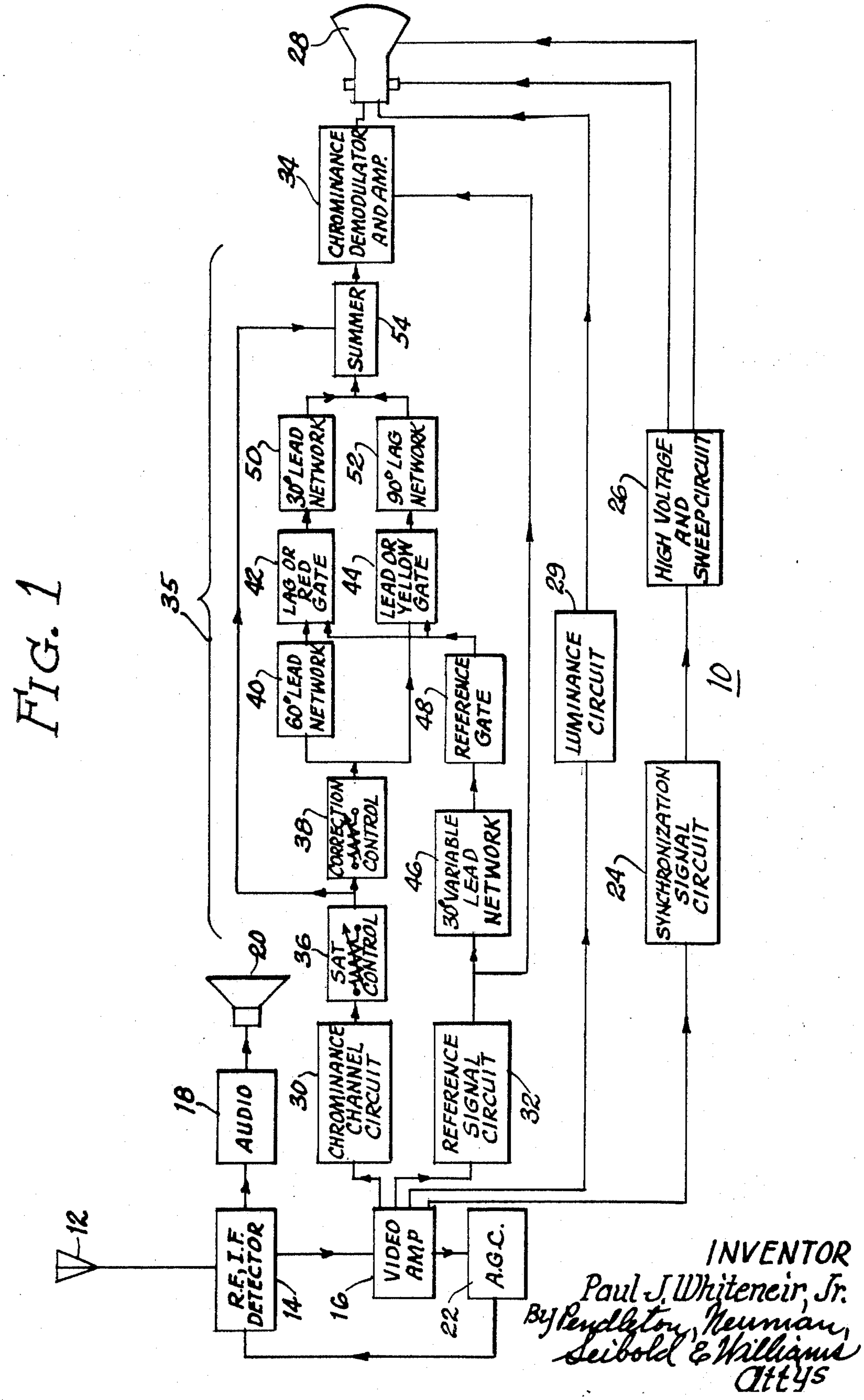
FIG. 1 is a block diagram of a television receiver incorporating one embodiment of this invention.

A color television receiver 10 for use with the NTSC color television transmission system, and incorporating one embodiment of the hue expander circuit of the present invention is disclosed in FIG. 1. The overall operation of the receiver shown is conventional and will be briefly described. The hue expander circuit of this invention will then be described in greater detail.

An antenna 12 is connected to the input of a stage 14 which amplifies the received composite color television radio frequency signal, converts it to an intermediate frequency signal, amplifies that intermediate frequency signal, and then detects the amplitude modulated waveform of the intermediate frequency signal to recover the video signal. That video signal is applied to and amplified by a video amplifier stage 16. A second output from stage 14 is applied to audio stage 18 which detects and amplifies the frequency modulations in the intermediate frequency signal to recover the intercarrier sound signal and applies that to a sound reproducer or speaker 20. A first output from video amplifier 16 is applied to an automatic gain control circuit 22 which is, in turn, coupled to stage 14 for varying the gain of that stage to compensate for variations in amplitude of the received signal. A second output from video amplifier 16 is applied, in turn, to a synchronization circuit 24, which recovers the synchronization information from the received video signal, and a high voltage and sweep circuit 26, which develops the required deflection signals and high voltages and applies them to a deflection yoke on and an accelerating electrode in a picture tube 28, respectively. A third output from video amplifier 16 is applied to a luminance circuit 29 which applies the required luminance signal to the electron gun of picture tube 28. Outputs from video amplifier 16 are additionally connected to a chrominance channel circuit 30 and a reference signal circuit 32. The output from reference signal circuit 32 is coupled to a chrominance demodulator and amplifier 34. The chrominance signal output of demodulator 34 is applied to the electron gun structure in picture tube 28.

Chrominance channel circuit 30 delivers at its output the modulated chrominance signal; its output is normally taken from the bandpass amplifier. Reference signal circuit 32 develops a 3.58 mHz. sine wave reference signal nominally at I phase with respect to the phase of the color burst signal. The outputs of chrominance channel circuit 30 and reference signal circuit 32 are then applied to inputs of a hue expander circuit 35 of this invention and thence to an input of the chrominance demodulator and amplifier 34. The hue expander circuit detects when the chrominance signal phase is within a predetermined range of the reference signal phase and then adds appropriate quadrature correction vectors which alter the chrominance signal phase toward the reference or I phase. Thus when the hue of the received signal is in the vicinity of flesh, it is automatically shifted toward flesh by the hue expander circuit 35.

Turning now to the hue expander circuit 35, the chrominance signal from the output of chrominance channel circuit 30 is applied seriatim to a saturation control 36 and a correction control 38. The controls merely comprise signal varying means for conveniently varying the levels of their respective output signals. The output of correction control 38 is applied to an input of an approximate 60 degree lead network 40 having an output signal which leads its input signal by 60 approximate degrees at 3.58 mHz. The output of network 40 is applied to a first input of a lag or red gate 42. The output of correction control 38 is also applied directly to a first input of a lead or yellow gate 44.

The I phase reference signal from reference signal circuit 32 is coupled through an approximately 30 degree variable lead network 46 to an input of a reference gate 48 such that the signal applied to the reference gate is advanced in phase approximately 30 degrees from I phase, henceforth referred to as the reference phase. The output of reference gate 48 is connected to second inputs of both lag or red gate 42 and lead or yellow gate 44. Reference gate 48 develops a generally rectangular wave output signal over a predetermined phasic portion of the 3.58 mHz. sine wave signal applied to it from lead network 46. Lag or red gate 42 and lead or yellow gate 44 then both use that output signal to detect the presence of components in the chrominance signal delivered to them having a phase in the vicinity of the reference phase. Since the reference phase leads I phase by approximately 30 degrees and the chrominance signal is applied to gate 44 unaltered in phase, that gate detects the presence of components in the chrominance signal leading I phase by approximately 30 degrees, i.e., components representing yellow hues. The chrominance signal applied to gate 42 is, however, advanced in phase by approximately 60 degrees over its unaltered state, i.e., 30 degrees further than the reference phase. Gate 42 therefore detects the presence of components in the chrominance signal lagging I phase by approximately 30 degrees, i.e., components representing red hues.

Lag and lead gates 42 and 44, then, produce at their outputs 3.58 mHz. signals at approximately the reference phase and at a magnitude proportional to the amplitude of the red or yellow components in the received chrominance signal. The output of lag or red gate 42 is applied to an approximate 30 degree lead network 50 producing at its output a 3.58 mHz. sine wave approximate 30 degrees advanced in phase from the output of gate 42. The total phase shift through 60 degree lead network 40 and 30 degree lead network 50 is thus approximately 90 degrees. The output of 30 degree lead network 50 is thus a 3.58 mHz. sine wave phase advanced approximately in quadrature with the red components of the chrominance signal. The output of lead or yellow gate 44 is applied to an approximate 90 degree lag network 52 producing at its output a 3.58 mHz. sine wave 90 degrees retarded in phase from the output of gate 44. The output of 90 degree lag network 52 is thus a 3.58 mHz. sine wave phase retarded in approximate quadrature with the yellow components of the chrominance signal.

The outputs of saturation control 36, lead network 50, and lag network 52 are applied to inputs of a summer 54 which adds them together, perhaps with some adjustment in their relative magnitudes, and isolates the chrominance channel circuit from the output of the hue expander. The quadrature signals thus add to the chrominance signals and tend to shift those chrominance signals representative of red or yellow hues toward flesh.

Figure 2:
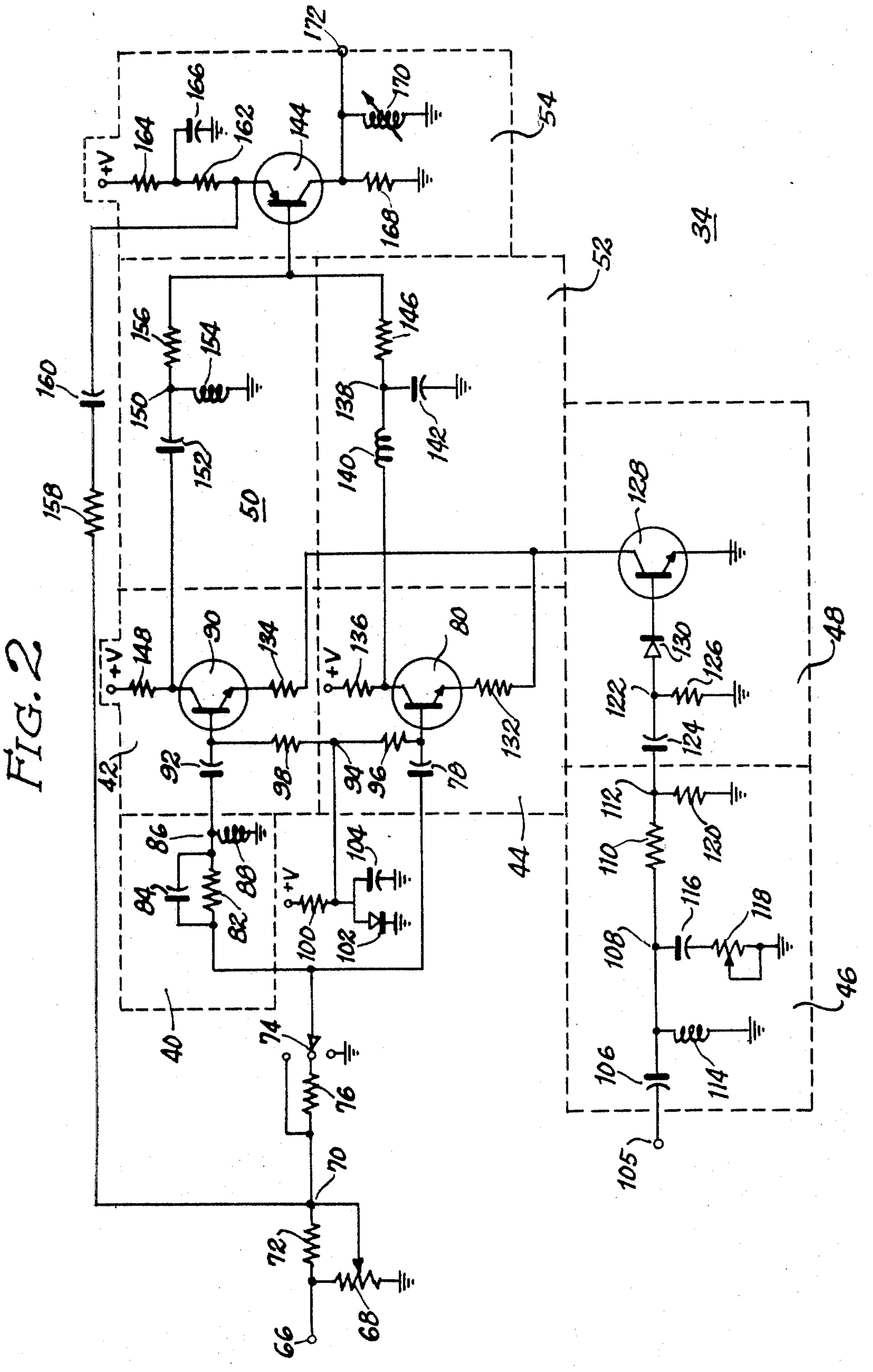
FIG. 2 is a schematic diagram of a hue expander circuit of this invention.

FIG. 2 is a schematic diagram of a hue expander circuit 34 of FIG. 1. The received chrominance signal is applied to an input terminal 66 which is connected both to ground through the resistive element of a saturation control potentiometer 68 and to a circuit point 70 through a resistor 72. The wiper arm of potentiometer 68 is connected to circuit point 70. A first contact of a single pole triple throw correction control switch 74 is directly connected to the circuit point 70, a second contact is coupled to circuit point 70 through a resistor 76, and a third contact is connected to ground. The movable contact of correction control switch 74 is coupled through a blocking capacitor 78 to the base of an NPN lead gate transistor 80 and through the parallel combination of a resistor 82 and a capacitor 84 to a circuit point 86. Circuit point 86 is coupled to ground through an inductor 88 and to the base of an NPN lag gate transistor 90 through a blocking capacitor 92. The combination of resistor 82, capacitor 84, and inductor 88 forms a 60 degree phase shifting network. The bases of transistors 80 and 90 are coupled to a circuit point 94 through resistors 96 and 98, respectively, which is, in turn, coupled both to a source of positive voltage V through a dropping resistor 100 and to ground through the parallel combination of a diode 102 and a filter capacitor 104. Diode 102 is oriented so that its direction of high positive conductivity is toward ground. A voltage is developed at circuit point 94 so that, in the quiescent state, transistors 80 and 90 are biased at their point of conduction onset.

A continuous wave 3.58 mHz. reference signal at I phase is applied to an input terminal 105 which is coupled through a capacitor 106 to a terminal point 108 and, in turn, through a resistor 110 to a terminal point 112. Terminal point 108 is coupled to ground both through an inductor 114 and through the series combination of a capacitor 116 and the resistive element of a phase adjusting potentiometer 118. The wiper arm of potentiometer 118 is also connected to ground. Circuit point 112 is coupled to ground through a resistor 120 and to a circuit point 122 through a capacitor 124. Circuit point 122 is coupled to ground through a resistor 126 and to the base of an NPN reference gate transistor 128 through a diode 130, the diode being oriented so that its direction of high positive conductivity s toward the base of transistor 128, thus protecting the transistor 128 from reverse voltages and aiding in shaping and controlling the width of the collector current pulses in transistor 128. The total phase shift between input terminal 105 and circuit point 122 is approximately 30 degrees leading but this may be varied by adjusting potentiometer 118.

The emitter of transistor 128 is connected to ground while the collector is coupled to the emitters of transistors 80 and 90 through resistors 132 and 134, respectively. Transistor 128 conducts during only a small phasic portion of the applied reference signal, here approximately 30 degrees centered about the reference signal positive peak. The collector of transistor 80 is coupled to a source of positive voltage V through a resistor 136 and to a circuit point 138 through an inductor 140; circuit point 138 is coupled both to ground through a capacitor 142 and to the base of a PNP summer transistor 144 through a resistor 146. The collector of transistor 90 is coupled to a source of positive voltage V through a resistor 148 and to a circuit point 150 through a capacitor 152; circuit point 150 is coupled both to ground through an inductor 154 and to the base of transistor 144 through a resistor 156.

The phase lag between the collector of transistor 80 and the base of transistor 144 is approximately 90 degrees, while the phase lead between the collector of transistor 90 and the base of transistor 144 is approximately 30 degrees. Circuit point 70 is coupled through the series combination of resistor 158 and capacitor 160 to the emitter of transistor 144. The emitter of transistor 144 is coupled to a source of positive voltage V through the series combination of resistors 162 and 164; the junction of those two resistors is coupled through a capacitor 166 to ground. The collector of transistor 144 is coupled to ground through the parallel combination of resistor 168 and variable inductor 170 tuned to approximately 3.58 mHz. and to an output terminal 172. Output terminal 172 is then connected to the input of chrominance demodulator and amplifier 34.

Figure 5:
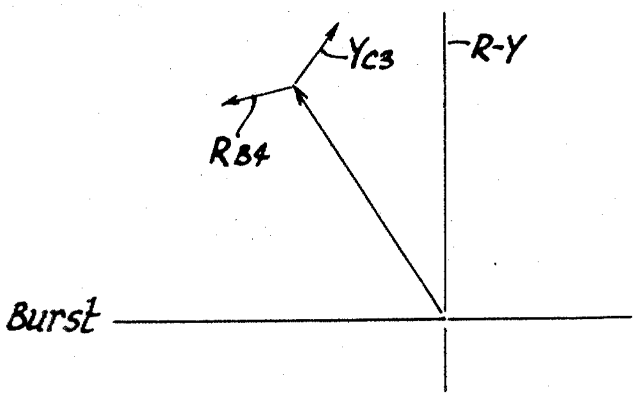

In one application of the embodiment of FIG. 5, the components used had the following values:

Resistor 68—500 ohms
Resistor 72—390 ohms
Resistor 76—560 ohms
Capacitor 78—0.01 microfarad
Resistor 82—2.2 kilohms
Capacitor 84—43 picofarads
Inductor 88—27 millihenries
Capacitor 92—0.01 microfarad
Resistor 96—2.2 kilohms
Resistor 98—2.2 kilohms
Resistor 100—10 kilohms
Capacitor 104—0.01 microfarad
Capacitor 106—47 picofarads
Resistor 110—330 ohms
Inductor 114—68 microhenries
Capacitor 116—150 picofarads
Potentiometer 118—6 kilohms
Resistor 120—820 ohms
Capacitor 124—0.01 microfarad
Resistor 126—8.2 kilohms
Resistor 132—220 ohms
Resistor 134—270 ohms
Resistor 136—1 kilohm
Inductor 140—56 millihenries
Capacitor 142—20 microfarads
Resistor 146—4.7 kilohms
Resistor 148—1 kilohm
Capacitor 152—20 microfarads
Inductor 154—120 millihenries
Resistor 156—4.7 kilohms
Resistor 158—330 ohms
Capacitor 160—0.01 microfarad
Resistor 162—330 ohms
Resistor 164—680 ohms
Capacitor 166—0.01 microfarad
Resistor 168—1.5 kilohms
Inductor 170—12–35 millihenries The transistor types used were:

Transistor 80—SE5025
Transistor 90—SE5025
Transistor 128—2N5134
Transistor 144—2N4916

The positive voltage source V used was 20 volts and this developed an 0.6 volt bias at circuit point 94.

Figure 3:
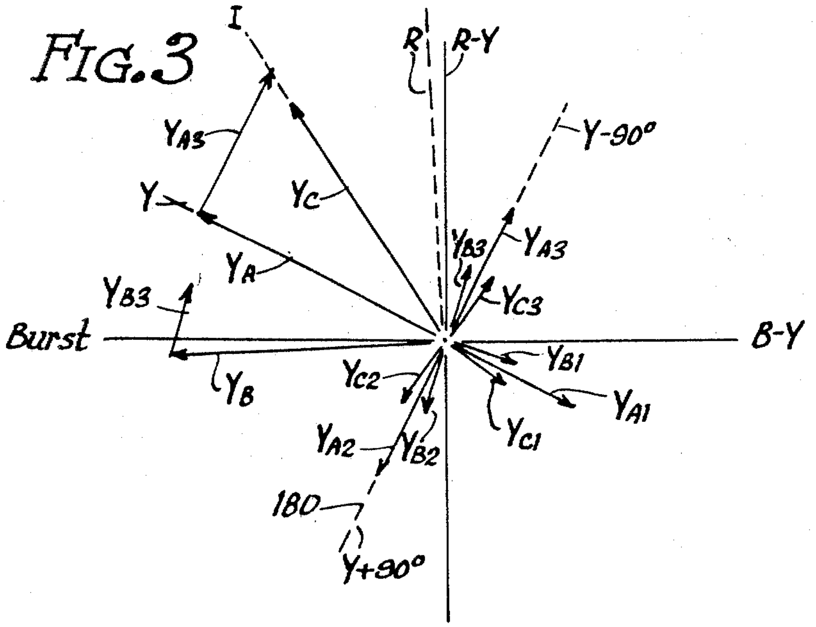
FIGS. 3, 4 and 5 are NTSC chromaticity diagrams for aid in understanding this invention.
Figure 4:
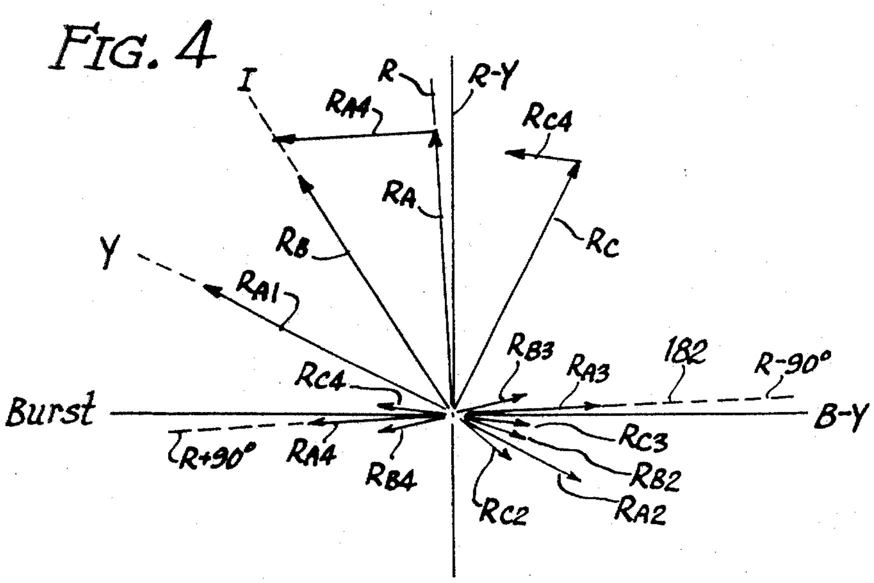

FIG. 3, 4 and 5 are conventional NTSC chromaticity diagrams for aid in explanation of the operation of the circuit of FIG. 2. In those diagrams the chrominance of any color may be represented by specifying its phase or angular displacement with respect to a reference axis, in this case the B–Y axis, and its magnitude. The phase and magnitude correspond to the hue and saturation, respectively, of the color. As is conventional, the I or flesh axis leads the B–Y axis by 123 degrees. Chrominance signals representative of red or yellow hues lie along the R or Y axes shown, lagging or leading the flesh axis by 30 degrees, respectively. In FIG. 3 a vector $Y_A$ is shown lying on the Y axis. When the chrominance channel circuit 30 delivers a sign represented by vector $Y_A$ then the signals at the first and second inputs of yellow gate 44 are in phase. Transistor 80 in gate 44 is conductive only when a zero volt signal is applied to its emitter, i.e., when transistor 128 is conductive. The base-emitter junction of transistor 80 is biased to be at the point of conduction onset when transistor 128 is conductive. The reference signal output of reference gate 48 is thus used to key the conduction of the chrominance signal gates 42 and 44. When the signals applied to the first and second inputs of gate 44 are in phase, a negative going series of pulses will be developed at the collector of transistor 80, the polarity inversion occurring because transistor 80 is connected in a common emitter configuration for the chrominance signal. The lag network 52 has a ringing effect which causes the pulse series to appear as a 3.58 mHz. sine wave 180° removed from the chrominance signal, as represented by vector $Y_{A1}$ in FIG. 3. Ninety degree lag network 52 then retards the signal represented by $Y_{A1}$ to $Y_{A2}$. That signal is applied to the base of transistor 144 in summer 54. Transistor 144 is in a common emitter configuration for signals applied to its base but is in a common base configuration for the chrominance signal applied to its emitter. The signal represented by vector $Y_{A2}$ is thus phase inverted to a signal represented by $Y_{A3}$ and added to the original chrominance signal $Y_A$. The result may be determined by transposing vector $Y_{A3}$ to the tip of vector Y and adding them graphically. The result is seen to be a signal along the flesh axis. The yellow chrominance signal at Y phase has thus been converted to a signal at I phase which will produce a color having a hue characteristic of flesh on the face of the receiver picture tube.

Similarly, there is shown in FIG. 4 a red vector $R_A$ lagging the flesh axis by 30 degrees. When the chrominance channel circuit 30 delivers a signal represented by vector $R_A$, it is phase advanced by 60 degree lead network 40 to a signal represented by vector $R_{A1}$. That signal is applied to the first input of red gate 42 which, as with yellow gate 44, develops at its output at the collector of transistor 90 in cooperation with the ringing effect of lead network 50 a signal represented by vector $R_{A2}$. That signal is then phase advanced by 30 degree lead network 50 to a signal represented by $R_{A3}$ which is then phase inverted to $R_{A4}$ and added to the original chrominance signal $R_A$ by summer 54. The result is a signal represented by the graphical sum of vectors $R_A$ and $R_{A4}$, which, as shown, lies along the I or flesh axis.

Lag and lead gates 42 and 44 each develop an output signal only when the signal at the first input is positive at the time a zero volt or ground reference signal is applied to the second input. Either gate will thus have an output signal when the signal applied to its first input has a phase within plus or minus 90 degrees of the reference signal. Lead gate 44 produces an output signal when the chrominance signal delivered by chrominance channel circuit 30 has a phase on the left-hand side of dashed line 180 in FIG. 3 and lag gate 42 produces an output signal when that chrominance signal has a phase on the upper side of dashed line 182 in FIG. 4. Signals lying within both of those defined areas will produce outputs from both gates. If the phase duration of the reference signal approaches zero degrees, the output signal from either gate would be 180 degrees out of phase with the reference signal and have a magnitude proportional to the absolute value of the cosine of the angle between the reference signal and the signal applied to the first gate input. The gates might then be viewed as resolving the applied chrominance signals into their components along the R and Y axes.

In the described embodiment, however, the reference signals applied to the second inputs of red gate 42 and yellow gate 44 are of finite phase duration, i.e., approximately 30 degrees of the 3.58 mHz. signal. If, therefore, signals are applied to the first input of yellow gate 44 which lead or lag $Y_A$, such as $Y_B$ or $Y_C$ leading and lagging $Y_A$ by 30 degrees, respectively, then the signal at the gate output will lead or lag $Y_{A1}$ by as much as 15 degrees and may be shown as $Y_{B1}$ and $Y_{C1}$. The signals applied to summer 54 will also lead or lag $Y_{A2}$ as shown at $Y_{B2}$ and $Y_{C2}$ and the correction signals added to the original chrominance signals $Y_B$ and $Y_C$ will lead and lag $Y_{A3}$, as at $Y_{B3}$ and $Y_{C3}$. Similarly with red gate 42, if the applied chrominance signals lead or lag $R_A$, such as $R_B$ or $R_C$ leading and lagging $R_A$ by 30 degrees, respectively, then the final correction signals developed, $R_{B4}$ and $R_{C4}$ will lead and lag $R_{A4}$ by as much as 15 degrees. ($R_{B1}$ and $R_{C1}$ have been omitted from FIG. 4 for clarity.)

If a chrominance signal lying along the flesh axis, as represented by $Y_C$ and $R_B$, is supplied to the hue expander circuit shown, then the yellow and red gates will produce correction vectors $Y_{C3}$ and $R_{B4}$, respectively, which are both added to the original flesh signal as shown in FIG. 5. The net change in phase produced by those correction vectors will be zero. Correctly phased flesh signals will thus not be altered in phase by the hue expander circuit. However, all other signals within the phase range bounded by axes lagging the red axis by 90 degrees and leading the yellow Y axis by 90 degrees will undergo a net phase shift toward the flesh axis. Signals within a phase range generally bounded by the R and Y axes will be shifted to the flesh axis while signals further removed from flesh than those two axes will only be shifted toward flesh by amounts which decrease in magnitude as the phase position is more removed from flesh. (Red gate 42 and yellow gate 44 would similarly produce correction signals if signals represented by $Y_A$ and $R_A$, respectively, were applied to the hue expander circuit. These have not been shown in the figures because of their diminutive size.)

It will be noted that the hue expander circuit described also slightly affects the magnitude of the applied chrominance signal and thus the saturation of certain colors reproduced on the picture tube face. It has been determined that the magnitude variations produced are not objectionable. The magnitude of the correction signals, and thus the amount of the phase and magnitude variation introduced by the hue expander circuit, may be altered by changing the values of the components used in circuits 40, 42, 44, 50, 52 and 54. Further, the amount of correction introduced by the circuit may be adjusted by changing the position of switch 74. The phase shifts of networks 40, 50 and 52 may be altered to vary the phase of the added correction signals. No attempt has been made in FIGS. 3, 4 and 5 to accurately note the magnitudes of the vector produced by the circuit of FIG. 2 as the figures are for the purpose of explanation only.

It will be obvious that many modifications of the specific embodiments shown may be made without departing from the spirit and scope of this invention. For example, while the order and manner in which the various vector transformations of the fixed phase reference signals and the received chrominance signals are performed are very simple and convenient, they could be done in many different ways while still falling within the scope of this invention. Further, many modifications could be made to the described circuitry without taking it outside the scope of this invention.

It will also be apparent that this invention could be used in many different applications. The delivered signal on which it operates could originate from any one of a number of sources. The delivered signal might be derived from another signal which has been electromagnetically transmitted, or it might be electro-magnetically transmitted itself. The delivered signal might be supplied from a transmission cable or from a prior stage in a signal processing device. The delivered signal might be received in a digital, discrete form rather than a continuous form. Additionally, the delivered signal might be representative of many different types of information.

It will thus be apparent that a hue expander circuit has been provided fulfilling all of the above mentioned objects. While one particular embodiment of this invention is shown above, it will be understood, of course, that the invention is not to be limited thereto since many modifications may be made. It is contemplated, therefore, by the appended claims, to cover any such modifications as fall within the true spirit and scope of this invention.

I claim:

1. A circuit for modifying a delivered electrical signal having a phase parameter variable over a wide range measured with respect to a reference phase and representative of information comprising:

coupling means for simultaneously supplying said delivered electrical signal at a plurality of phase relationships with respect to said reference phase;

reference gate means for supplying a reference signal having a predetermined phase relationship to said reference phase;

a plurality of signal gating means, each individual signal gating means coupled to said coupling means and said reference gate means for selecting components of the delivered signal applied to that individual signal gating means within a predetermined phasic range; and signal altering means coupled to said plurality of signal gating means for combining said delivered electrical signal and said selected components in a predetermined manner.

2. The circuit of claim 1 wherein when said phase parameter is within a predetermined range within said wide range said phase parameter is altered toward a phase parameter having a known informational value and said signal altering means further comprises second coupling means coupled to said signal gating means for phase shifting said selected components and summing means coupled to said second coupling means for summing said phase shifted components and said delivered electrical signal.

3. A hue modifying circuit for use in a color television system including a chrominance channel supplying a chrominance signal and a reference generator supplying a signal at a reference phase, said hue modifying circuit comprising:

coupling means coupled to said chrominance channel for simultaneously supplying said chrominance signal at a plurality of phase relationships;

reference gate means coupled to said reference generator for supplying a reference signal having a predetermined phase relationship to said reference phase;

a plurality of chrominance gate means, each individual chrominance gate means coupled to said coupling means and said reference gate means for selecting those components of the chrominance signal applied to that individual chrominance gate means within a predetermined phasic range; and hue altering means coupled to said chrominance channel and said plurality of chrominance gate means for combining said chrominance signal and said selected components in a predetermined manner.

4. The hue modifying circuit of claim 3 wherein when the phase of said chrominance signal is within a known phase range the phase is altered toward a preset phase representative of a known hue and said hue altering means comprises second coupling means coupled to said chrominance signal gating means for phase shifting said selected components and summing means coupled to said second coupling means for summing said phase shifted selected components and said chrominance signal.

5. The hue modifying circuit of claim 4 wherein said preset phase is representative of a flesh hue.

6. A hue expander circuit for use in a color television system having a chrominance channel supplying a chrominance signal and a reference generator supplying a signal at a reference phase, said hue expander circuit comprising:

first and second coupling means coupled to said chrominance channel for supplying said chrominance signal at first and second different phase relationships with respect to said reference phase;

reference gate means coupled to said reference generator for supplying a reference signal having a predetermined phase relationship to said reference phase;

first and second chrominance signal gate means each coupled to said reference gate and said first and second coupling means, respectively, for developing first and second signals indicative of the phase relationship between said reference signal and said chrominance signal at said first and second phase relationships; and hue altering means coupled to said chrominance channel and said first and second chrominance channel gate means for combining said chrominance signal and first and second signals in a predetermined manner.

7. The hue expander circuit of claim 6 wherein said first and second signals are the components in the chrominance signals at said first and second phase relationships at the phase of said reference signal.

8. A hue expander circuit for use in a color television system including a chrominance channel for delivering a chrominance signal and a reference signal generator for supplying a reference signal, said hue expanding circuit comprising:

coupling means for simultaneously supplying said chrominance signal at a plurality of phase relationships;

a reference gate coupled to said reference signal generator;

a plurality of chrominance gate means each coupled to said coupling means and said reference gate for determining when the chrominance signal applied to it and said reference signal are within one of a plurality of predetermined phasic relationships; and hue altering means coupled to said chrominance channel means and said chrominance gate means for altering said chrominance signal when the chrominance signal applied to at least one of said gate means and said reference signal are within one of said predetermined phasic relationships.

9. A color television flesh expander circuit for use in a color television having a chrominance channel supplying a chrominance signal and a reference generator supplying a signal at a reference phase and comprising:

first coupling means coupled to said chrominance channel for supplying said chrominance signal at a first phase relationship with respect to said supplied chrominance signal;

second coupling means coupled to said chrominance channel for supplying said chrominance signal at a second phase relationship with respect to said supplied chrominance signal;

third coupling means coupled to said reference generator for supplying a signal at a preset phase with relation to said reference phase;

a reference gate coupled to said third coupling means;

a first chrominance gate coupled to said first coupling means and said reference gate;

a second chrominance gate coupled to said second coupling means and said reference gate;

phase shift means coupled to the outputs of said first and second gates for phase shifting the signals at said outputs; and a summer coupled to the outputs of said phase shift means and said chrominance channel.

10. a hue expander circuit for use in a color television system including a chrominance channel for delivering a chrominance signal and a reference signal generator for supplying a reference signal, said hue expander circuit comprising:

first and second coupling means for supplying said chrominance signal at first and second phase relationships to said delivered chrominance signal;

a reference gate coupled to said reference generator;

first chrominance gate means coupled to said first coupling means and said reference gate for determining when said chrominance signal at said first phase relationship and said reference signal are within a first predetermined phasic relationship;

second chrominance gate means coupled to said second coupling means and said reference gate for determining when said chrominance signal at said second phase relationship and said reference signal are within a second predetermined phasic relationship; and hue altering means coupled to said chrominance channel means and said first and second gate means for altering said chrominance signal when said reference signal and said chrominance signal in said first or second phase relationship are within said first or second predetermined phasic relationship.

11. Hue altering apparatus for a color television receiver comprising:

a reference signal generating means for generating a reference signal at a predetermined phase;

first phase shift means coupled to the output of said reference signal generating means for phase shifting said reference signal;

chrominance channel receiving means for supplying a received chrominance signal;

first gate means coupled to said chrominance channel receiving means and said first phase shift means for determining when the signals appljed to it are within a predetermined phasic relationship;

second phase shift means coupled to the output of said first gate means for phase shifting the output signal from said first gate means;

third phase shift means coupled to said chrominance channel receiving means for phase shifting said received chrominance signal;

second gate means coupled to said first phase shift means and said third phase shift means for determining when the signals applied to it are within a predetermined phasic relationship;

fourth phase shift means coupled to the output of said second gate means for phase shifting the output signal from said second gate means; and summer means coupled to said second phase shift means, said fourth phase shift means, and said chrominance channel receiver for combining the signals applied to it.

No references cited.

RICHARD MURRAY, Primary Examiner

PO-1050
(5/69)

UNITED STATES PATENT OFFICE
CERTIFICATE OF CORRECTION

Patent No. 3,525,802 Dated August 25, 1970

Inventor(s) P. J. Whiteneir, Jr.

It is certified that error appears in the above-identified patent and that said Letters Patent are hereby corrected as shown below:

Column 2, line 57 - Delete "gun" and insert therefor -- guns --;

Column 3, line 70 - Insert "all" before -- applied --;

Column 4, line 14 - After "a" insert -- resistor 77 to a circuit point 78 which is, in turn, coupled through a--;

Column 4, line 15 - Delete "78" and insert therefor -- 79 --;

Column 4, line 32 - Delete "A" and insert therefor -- In certain applications of this invention it has been found convenient to use a reference signal circuit 32 supplying a signal at R-Y phase rather than at I phase as discussed above in relation to Fig. 1. The nominal phase lead of variable lead network 46 is then 63 degrees rather than 30 degrees. Accordingly, a --;

Column 4, line 32 - At the end of the line delete "I" and insert therefor -- R-Y --;

Column 4, line 46 - Delete "s" and insert therefor -- is --;

Column 4, line 51 - Delete "30" and insert therefor -- 63 --;

Column 5, after the line reading "Resistor 76 - 560 ohms" insert a new line reading -- Resistor 77 - 560 ohms --;

Column 5, in the line reading "Capacitor 78 - 0.01 microfarads" delete "78" and insert therefor -- 79 --;

Column 5, in the line reading "Inductor 88 - 27 millihenries" delete "millihenries" and insert therefor -- microhenries --

Column 5, in the line reading "Inductor 114 - 68 microhenries " delete "68" and insert therefor -- 6.8 --;

PO-1050
(5/69)

UNITED STATES PATENT OFFICE

CERTIFICATE OF CORRECTION

Patent No. 3,525,802 Dated August 25, 1970

Inventor(s) P. J. Whiteneir, Jr.

It is certified that error appears in the above-identified patent and that said Letters Patent are hereby corrected as shown below:

Column 5, in the line reading "Inductor 140 - 56 millihenries" delete "millihenries" and insert therefor -- microhenries --;

Column 5, in the line reading "Capacitor 142 - 20 microfarads" delete "microfarads" and insert therefor -- picofarads --;

Column 5, in the line reading "Capacitor 152 - 20 microfarads" delete "microfarads" and insert therefor -- picofarads --;

Column 5, in the line reading "Inductor 154 - 120 millihenries" delete "millihenries" and insert therefor -- microhenries --;

Column 5, in the line reading "Inductor 170 - 12 - 35 millihenries" delete "millihenries" and insert therefor -- microhenries --;

Column 5, line 60 - Delete "FIG." and insert therefor -- FIGS. --;

Column 5, line 73 - Delete "sign" and insert therefor -- signal --;

Column 8, Claim 3, Line 53 - Indent the line;

Column 10, Claim 10, Line 6 - Delete "a" (first occurrence) and insert therefor -- A --;

Column 10, Claim 11, Line 33 - Delete "a" (first occurrence);

FIG. 2 of the drawing, insert a resistor immediately to the right of switch 74 and identify it with index number -- 77 --;

FIG. 2 of the drawing, identify the circuit connection to the right of switch 74 with index number -- 78 --; and FIG. 2 of the drawing, delete index number "78" identifying the capacitor within block 44 and substitute therefor index number -- 79 --.

Signed and sealed this 23rd day of November 1971.

(SEAL)
Attest:

EDWARD M.FLETCHER,JR.
Attesting Officer

ROBERT GOTTSCHALK
Acting Commissioner of Patents